US009295023B2

(12) United States Patent
Schier et al.

(10) Patent No.: US 9,295,023 B2
(45) Date of Patent: Mar. 22, 2016

(54) OPERATION OF A HETEROGENEOUS WIRELESS NETWORK BY DETERMINING LOCATION OF A WIRELESS DEVICE

(71) Applicant: ZTE Wistron Telecom AB, Stockholm (SE)

(72) Inventors: Thorsten Schier, Stockholm (SE); Patrick Svedman, Stockholm (SE); Aijun Cao, Stockholm (SE); Yonghong Gao, Stockholm (SE); Jan Johansson, Norrfjärden (SE); Bojidar Hadjiski, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 179 days.

(21) Appl. No.: 14/154,726

(22) Filed: Jan. 14, 2014

(65) Prior Publication Data
US 2014/0200009 A1 Jul. 17, 2014

Related U.S. Application Data

(60) Provisional application No. 61/752,898, filed on Jan. 15, 2013.

(51) Int. Cl.
*H04W 40/00* (2009.01)
*H04W 24/00* (2009.01)
*H04W 64/00* (2009.01)
*G01S 5/02* (2010.01)
*H04W 84/04* (2009.01)

(52) U.S. Cl.
CPC ............... *H04W 64/00* (2013.01); *G01S 5/02* (2013.01); *H04W 84/045* (2013.01)

(58) Field of Classification Search
None
See application file for complete search history.

(56) References Cited

U.S. PATENT DOCUMENTS

| 2010/0323720 A1 | 12/2010 | Jen |
| 2012/0213113 A1 | 8/2012 | Zhao et al. |
| 2013/0260798 A1 | 10/2013 | Moshfeghi |
| 2013/0272170 A1* | 10/2013 | Chatterjee ............ H04W 28/02 370/280 |

FOREIGN PATENT DOCUMENTS

| EP | 2 675 078 A2 | 12/2013 |
| WO | 2012/108716 A2 | 8/2012 |
| WO | 2012/112455 A1 | 8/2012 |
| WO | 2012/138769 A1 | 10/2012 |

OTHER PUBLICATIONS

Japanese Office Action mailed on Oct. 14, 2014 for Japanese Application No. 2014-004403, filed Jan. 14, 2014, translation included (7 pages).
UK Search and Examination Report mailed on Feb. 16, 2015 for UK Application No. 1500660.4, filed Jan. 15, 2015 (3 pages).
UK Search and Examination Report mailed on May 6, 2014 for UK Application No. 1400473.3, filed Jan. 13, 2014 (7 pages).

* cited by examiner

*Primary Examiner* — Erika A Washington
(74) *Attorney, Agent, or Firm* — Perkins Coie LLP

(57) ABSTRACT

A heterogeneous wireless communication network includes a macrocell base station that one or more low power nodes. The location of a wireless device is estimated based on feedback reports received from the wireless device in response to downlink transmissions of a reference signal. Based on the estimated location, a schedule for future transmissions of the reference signal to the wireless device are determined. The schedule specifies a frequency of transmission of the reference signals. The schedule specifies downlink transmission antenna configuration to be used for the reference signal transmissions.

15 Claims, 8 Drawing Sheets

| CSI-RS subframe nr | 1 | 2 | 3 | 4 | 5 | 6 | 7 | 8 | 9 | 10 | 11 | 12 | 13 |
|---|---|---|---|---|---|---|---|---|---|---|---|---|---|
| Method 1b (less sub-frames for link adaptation) (602) | M | LPN1 LPN2 LPN3 | LPN1 | M | LPN2 | LPN1 LPN2 LPN3 | LPN1 LPN2 | M | LPN3 | LPN1 LPN2 LPN3 | LPN3 M | LPN1 LPN2 LPN3 | M |
| CSI-RS transmission | | | | | | | | | | | | | |
| UE report for location estimation (604) | All | | All | | All | | All | | All | | All | | All |
| UE1 CQI for link adaptation (PDSCH from M) (606) | | | | | | | | | | | | | |
| UE2 CQI for link adaptation (PDSCH from LPN1+LPN2) (608) | | | | | | | | | | | | | |
| UE3 CQI for link adaptation (PDSCH from LPN3) (610) | | | | | | | | | | | | | |

FIG. 6

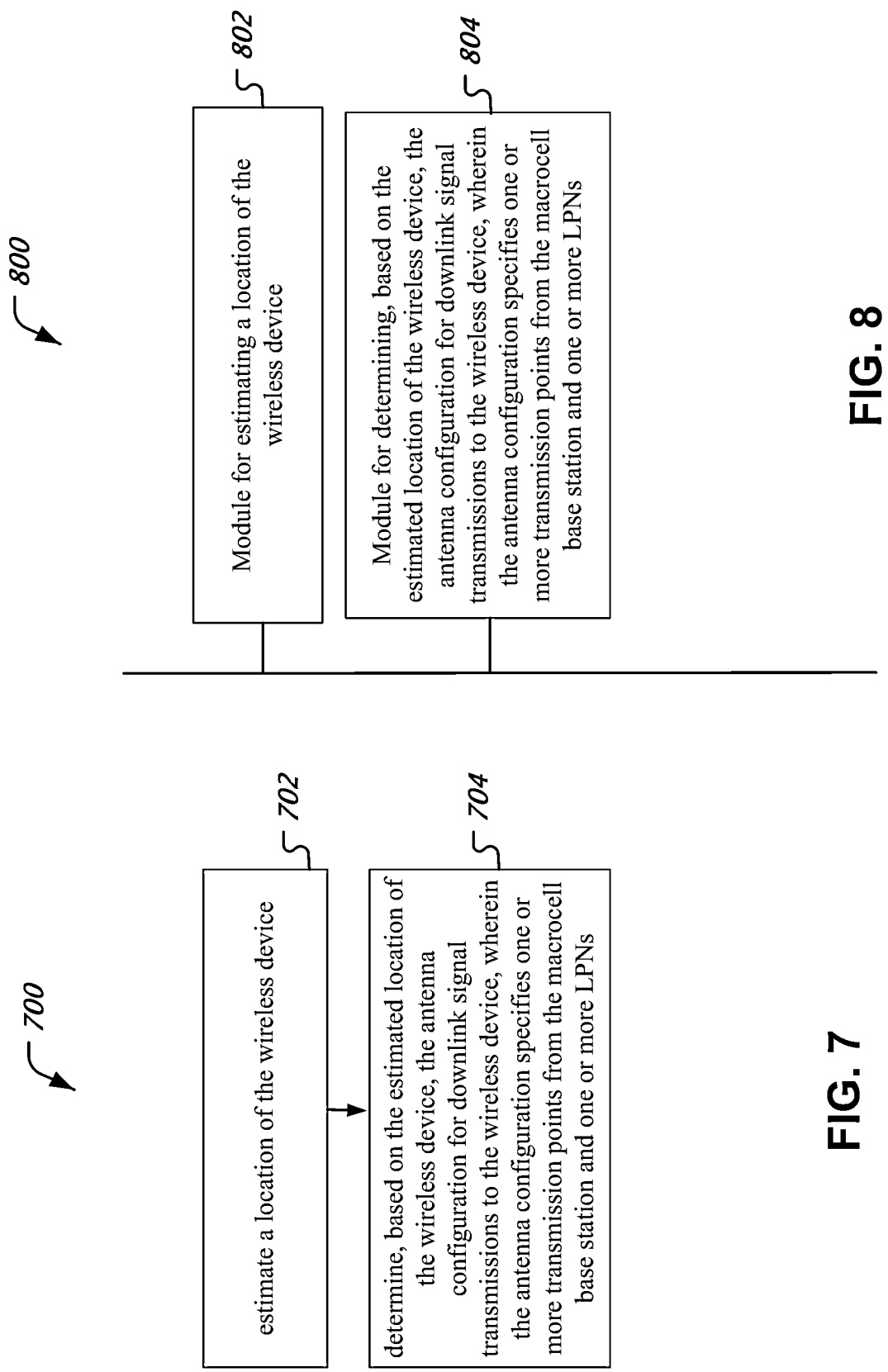

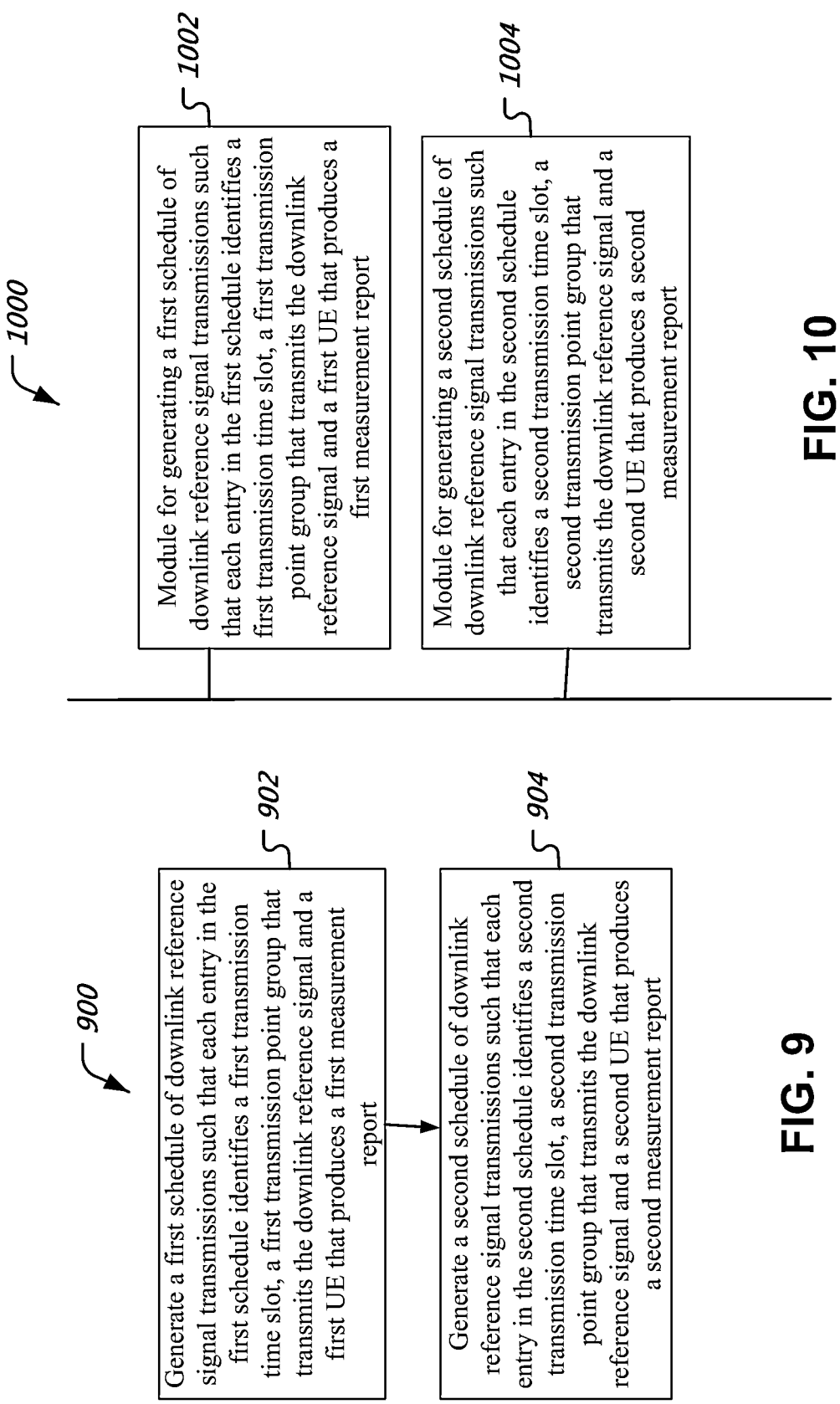

OPERATION OF A HETEROGENEOUS WIRELESS NETWORK BY DETERMINING LOCATION OF A WIRELESS DEVICE

CROSS-REFERENCE TO RELATED APPLICATION

This patent document claims the benefit of priority of U.S. Provisional Patent Application No. 61/752,898, filed on Jan. 15, 2013. The entire content of the before-mentioned patent application is incorporated by reference herein.

BACKGROUND

This document relates to cellular telecommunication systems, including heterogeneous networks where one or more low-power nodes are deployed at least partially within the coverage area of a macro base station.

Cellular communication systems are being deployed all over the world to provide voice services, mobile broadband data services and multimedia services. There is a growing need for cellular bandwidth due to various factors, including the continuous increase in the number of mobile phones such as smartphones that are coming on line and deployment of new mobile applications that consume large amounts of data, e.g., mobile applications in connection with video and graphics. As mobile system operators add new mobile devices to the network, deploy new mobile applications and increase the geographic areas covered by broadband mobile services, there is an ongoing need to cover the operator's coverage area with high bandwidth connectivity.

SUMMARY

Techniques for improving operational efficiency of a wireless network using information about locations of wireless devices being served by the wireless network are disclosed. In some implementations, a heterogeneous wireless communication network includes a macrocell base station that one or more low power nodes. The location of a wireless device is estimated based on feedback reports received from the wireless device in response to downlink transmissions of a reference signal (e.g., identity of the base station from which the reference signal is received). Based on the estimated location, a schedule for future transmissions of the reference signal to the wireless device is determined. Based on the estimated location, a transmission antenna configuration for downlink signal transmissions to the wireless device is determined.

In one aspect, methods, systems and apparatus are disclosed for selecting antenna configuration for signal transmissions to a wireless device in a heterogeneous wireless network (HetNet). The HetNet comprises a macrocell base station and one or more low power nodes (LPNs). The location of a wireless device is estimated. Based on the estimated location of the wireless device, the antenna configuration for downlink signal transmissions to the wireless device is determined. The antenna configuration specifies one or more transmission points from the macrocell base station and the one or more LPNs.

In another aspect, techniques are disclosed for scheduling downlink reference signal transmissions in a HetNet. A first schedule of downlink reference signal transmissions is generated. Each entry in the first schedule identifies a first transmission slot, a first transmission point group that transmits the downlink reference signal and a first user equipment (UE) that produces a first measurement report. A second schedule of downlink reference signal transmissions is generated such that each entry in the second schedule identifies a second transmission time slot, a second transmission point group that transmits the downlink reference signal and a second UE that produces a second measurement report. The first and the second schedules define transmission time slots such that a given time slot included in the second schedule is excluded from the first schedule. The first schedule is designed to receive the first measurement report from a given UE at a first repetition frequency that is smaller than a second repetition frequency with which the second measurement report is received from the given UE. The entries in the second schedule identify reference signal transmission from the second transmission point group to the second UE only when the second transmission point group is also being used to transmit user data to the second UE.

In another aspect, a wireless communication network includes a macrocell base station and two or more LPNs. The location of a UE is estimated based on transmissions of a reference signal from a first subset of transmission points from the available macrocell base station and the LPNs. The first subset is identified based on a previously estimated location of the UE. Downlink data transmissions are made to the UE from a second subset of transmission points that is selected based on the previously estimated location. Reference signal transmissions are made from the second subset of transmissions points and the UE sends corresponding channel quality reports for link estimation. The first subset of transmission points and the second subset of transmission points may be different from each other based on operational criteria such as an estimated movement direction of the UE, network load, topology of the LPNs, and so on.

These and other aspects, and their implementations and variations are set forth in the drawings, the description and the claims.

BRIEF DESCRIPTION OF THE DRAWINGS

FIG. 6 shows a schedule of reference signal transmissions in a wireless network.

FIG. 7 is a flow chart representation of a process of wireless communications.

FIG. 8 is a block diagram representation of a wireless network apparatus.

FIG. 9 is a flow chart representation of a process of for scheduling downlink reference signal transmissions in a wireless communication network.

FIG. 10 is a block diagram representation of an apparatus for scheduling downlink reference signal transmissions in a wireless communication network.

Like reference symbols in the various drawings indicate like elements.

DETAILED DESCRIPTION

Figure 1:
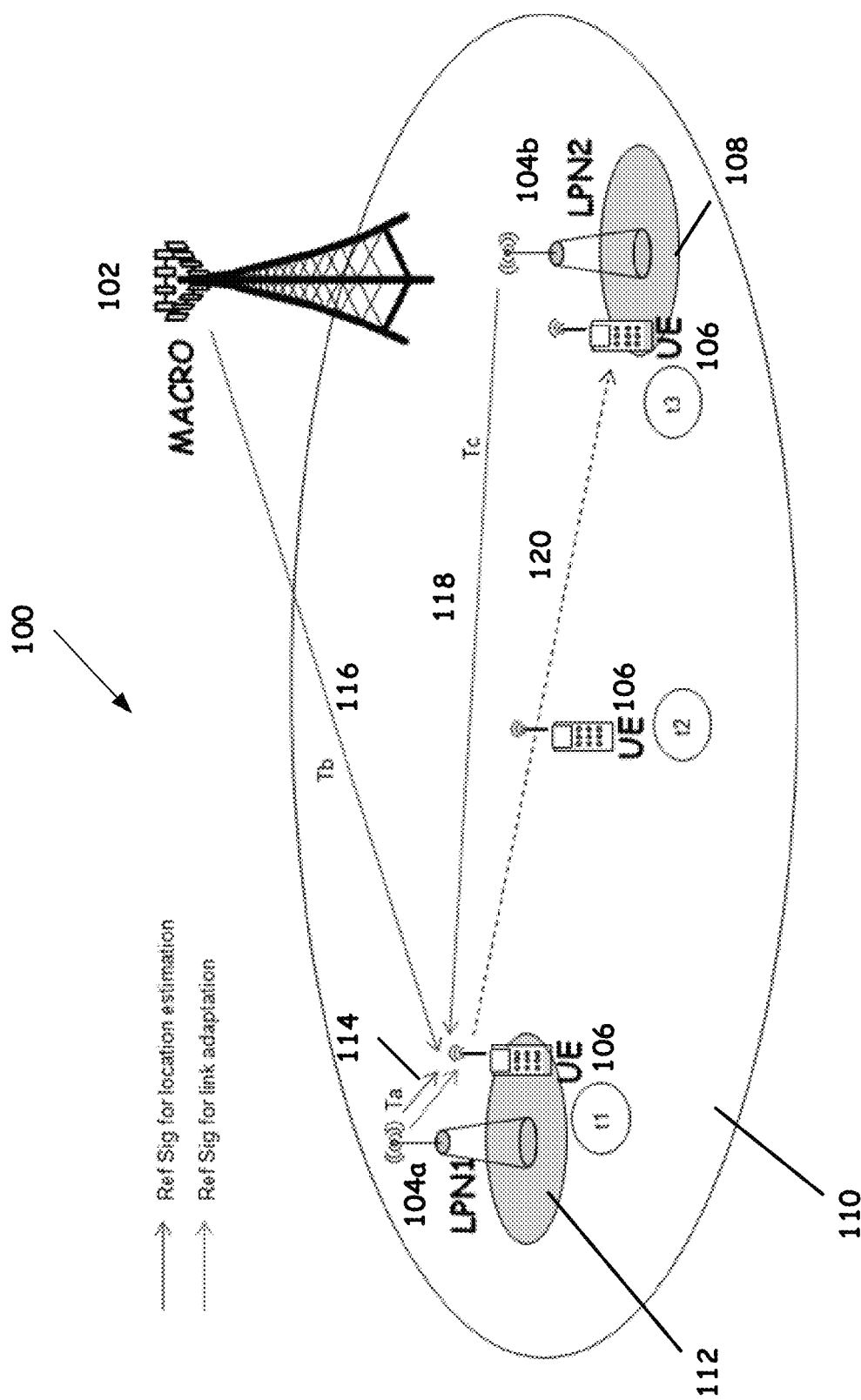
FIG. 1 depicts a wireless network deployment scenario in which at least two low power nodes are present in a macrocell.

A cellular communication system may provide both voice services and mobile broadband data services, e.g., using an Internet Protocol (IP) network. In the recent years, IP capable smartphones are being deployed in wireless communications network. These smartphones execute applications programs that use uplink and bandwidth data transmission bandwidth at an ever increasing rate. Therefore, there is an ongoing effort in wireless networks to increase the amount of uplink and downlink transmission bandwidth made available to wireless devices.

As the spectrum efficiency for the point-to-point link already approaches its theoretical limit, one way to address the ever-increasing demand for bandwidth is to split big cells into smaller and smaller cells and re-using the same frequency spectrum in different cells. This technique is sometimes called spatial re-use of the bandwidth. When cells are smaller and correspondingly the base stations serving the cells are closer to each other, the adjacent cell interferences may increase, thereby limiting bandwidth gains achieved by cell splitting. Another operational issue faced by wireless network operators is that it is often difficult to acquire and maintain new sites to install base stations. The increase in operational and capital expenses also may outweigh any bandwidth gain achieved by splitting the network into smaller and smaller cells.

Recently a new type of network configuration that offers a solution to the bandwidth bottleneck, sometimes called HetNet (Heterogeneous Network), has received a lot of interest in the wireless industry. In a HetNet, a tier consisting of multiple low-power nodes is added onto existing macro base stations to expand or improve the coverage. An existing macro base station works as a master and one or more Low Power Nodes (LPNs) work as slaves of the master in order to have better interference managements and resource allocation.

As in a traditional cellular wireless network, a HetNet can use several uplink and downlink reference signals for maintaining or improving network efficiency. Some downlink reference signals (i.e., reference signals transmitted from a network-side transmission point to wireless devices) may be unicast (i.e., intended to be received by one wireless device), while other reference signals may be broadcast (i.e., for reception by multiple wireless devices). In addition, the availability of geographically distributed transmission points opens up possibilities of achieving further operational improvements.

However, traditional wireless networks fail to fully exploit HetNet configurations to improve operational efficiency. The techniques disclosed in the present document can be used to improve the operation of a HetNet. For example, in traditional wireless networks, a reference signal is periodically transmitted in the downlink direction for the wireless devices operating in the network to provide a channel quality feedback to the base station. Wireless standards such as the Long Term Evolution (LTE) standard provide a closed form expression that allows user devices to identify the transmission resources (called resource blocks, or RBs in LTE) where these reference signal transmissions are located. The resources allocated to reference signal transmissions depend on cell identification and antenna port identification values. However, there is no dependency between user device locations and the reference signal transmission resources. Similarly, there is no dependency between resources allocated to reference signal transmissions from a particular antenna port and whether or not (and how much) downlink data is being transmitted from the transmission port. Traditional wireless networks are therefore unable to use the operational advantage offered by geographically distributed transmission points, as are available in HetNet deployments.

In applications, the presently disclosed techniques can be implemented to estimate location of a wireless device operating in a heterogeneous wireless network (e.g., which downlink transmission points or base stations a wireless device is near to). The location estimate obtained using reference signal transmissions (or otherwise) can then be used to determine a cell in which the wireless device is operating and downlink transmission point configurations (e.g., the node(s) and the antenna ports of these nodes) used for future transmissions of both downlink data and reference signals to the user devices.

Different transmission points (that are geographically distributed over the region covered by a wireless cell, i.e., having a same cell ID) can be assigned transmission resources at different repetition rates. The repetition rates may be a function of locations of user devices and/or the amount of downlink data being transmitted by the transmission points.

The above-discussed and additional features are further described in greater detail below.

In the description provided below, various techniques are described by using references to various building blocks and terms of an LTE wireless network. However, LTE used only for simplicity of explanation, and the disclosed techniques are not limited to LTE and may also be practiced in other communication networks such as WiMax, 4G and others.

As previously described, a HetNet comprises a Macro base station that controls one or more LPNs in its coverage area. In some deployments, the LPNs do not have their own cell ID; instead they are all sharing the same cell ID with the Macro station. A wireless device deduces cell ID from the primary and secondary synchronization signals (PSS/SSS) that are typically transmitted by the Marco base station only.

Some types of reference signal (e.g., the Cell-specific Reference Signal CRS of LTE) are always transmitted from the Macro base station. The LPNs may or may not transmit the CRS. Some other types of reference signals may be transmitted by both Macro base station and/or one or more LPNs. One example of such a reference signal in is the Channel State Information Reference Signal (CSI-RS) in LTE, which is discussed in greater detail below.

In LTE, CSI-RS sequences are located on resource elements (REs) that are usually reserved for the Physical Downlink Shared Channel (PDSCH). The PDSCH is used by the network to transmit downlink data, e.g., application layer user data, to the wireless devices (also called user equipment, or UE, in LTE) being served by the network. In LTE, a CSI-RS sequence is configured in a cell by defining the REs used, the sub-frames used and further by specifying the periodicity of the CSI-RS sub-frames. A CSI-RS sub-frame is an LTE sub-frame that allows the transmission of the CSI-RS reference symbols. The periodicity, or repetition rate, of the CSI-RS sub-frames is configurable between 5 and 80 (sub-frames) according to the LTE standard. For one sequence of transmission resource allocation, any number of antenna ports allowed in the standard (1, 2, 4 or 8) can be used. Different antenna ports can be located in different nodes. However, an LTE UE provides a single feedback, called Channel Quality Indicator (CQI) based on a received CSI-RS transmission. This means that the network does not get explicit feedback on which antenna (transmission point) has the best channel towards the UE, only based on the CQI feedback received from the UE.

Due to the ambiguity caused by a combined single report from UE in response to receiving reference signal transmissions from multiple transmission points, when a reference signal is transmitted by the network to the UE for the purpose of location estimation, it is beneficial to not transmit the reference signal simultaneously from two transmission points that are in different geographic locations, i.e., have different communication channels to the UE. One possible solution for location estimation is to allocate the same transmission resources only to the transmission points used for the reference signal transmission are located at the same node. This way, a CQI feedback from the UE can be associated with the channel quality from that node.

The UEs are spread out within the cell and could be mobile, i.e., dynamically changing their locations. Furthermore, to benefit from location estimation methods such as triangulation, channel quality feedback from a given UE for multiple geographically disparate transmission points may be used. Therefore, downlink reference signal transmissions can be targeted at a given UE on a periodic basis from all possible downlink transmission points in a HetNet. However, as further described in detail below, how often to send location estimation reference signals to a UE can be controlled with information about where the UE currently is, and in which direction the UE is moving.

In various implementations, downlink reference signals can be used in wireless networks for UE location estimation and in addition, for continuously monitoring channel quality between the network and the UE and adapting the transmission schemes accordingly. For example, in LTE, for the efficiency of the downlink transmission of the PDSCH, it is desirable to select the best suited node(s) for sending data. Therefore, as described in greater detail below, location information for a UE can not only be used determine which transmission points to use for downlink data transmissions, but also be used to determine how often to send, at from which transmission points to send, reference signals to the UE for the purpose of link quality estimation.

One way in which wireless networks can accommodate the above discussed different uses of reference signal transmissions from multiple transmission points is to uniformly allocate downlink transmission resources to all possible transmission points. However, in a HetNet with two or more LPNs under one Macro, many different transmission points may exist and it may not be possible to increase the total amount of downlink transmission bandwidth used for reference signal transmissions to accommodate the different uses.

Considering that UE locations are changing within the cell and, consequently, data transmission over the PDSCH is moved around between nodes, in some implementations, the old reference signal from a previous transmission point could be released and allocated to the new node for the purpose of link adaptation.

In some embodiments, the CSI-RS reference sequence, which is defined in 3GPP 36.211 R10, can be "re-purposed" to obtain information about the location of a UE. From an LTE compliant UE's perspective, there is no change in either receiving the CSI-RS or transmitting a response to the CSI-RS, as is specified by the LTE standard. However, the network processes the CSI-RS feedbacks to select the most suited transmission node (either a low power nodes or the Macro station) for downlink PDSCH transmission. The network also processes feedback received for the same CSI-RS transmission for link adaptation.

In some embodiments, to help with the dual use of CSI-RS feedback reports, a same CSI-RS sequence is scheduled for transmission with two different periodicities between from the different nodes (or transmission point configurations).

At a generally low, but configurable, rate, CSI-RS transmission opportunities may be allocated among all candidate transmission points. A candidate transmission point is any antenna at the Macro base station or an LPN or combination of antennas that could carry out a PDSCH transmission. In some embodiments, CSI-RS REs are allocated turn by turn among all nodes within the cell and a transmission point configuration for CSI-RS transmissions may match the transmission point configurations for PDSCH transmission. All UEs in the cell can be configured to report back the estimated CSI (e.g. CQI values and rank). The network uses this information as an input parameter for location estimation. The location estimation procedure may be continuously running to identify nodes for PDSCH transmission. Location estimation may be performed using a variety of techniques. For example, according to one technique, a triangulation method may be used to estimate UE distance from three geographically separate transmission points to estimate the region where the UE is located. In another technique, the UE may be deemed to be near a transmission point for which the CQI indicated the best possible channel (e.g., densest possible constellation for downlink transmissions). In some techniques, instantaneous location based on most recent readings may be used along with past readings to estimate a direction in which the UE is moving.

At a generally fast, but configurable, rate from a set of transmission points, CSI-RS transmissions may be scheduled for link adaptation. From these nodes the CSI-RS transmission is done at a faster repetition rate (compared to the location estimation related CSI-RS transmissions) and only the UEs targeted to receive PDSCH from these nodes are controlled to send feedback reports for link adaptation. As further described below, the set of transmission points scheduled for PDSCH and CSI-RS transmission can change dynamically depending on the output of the location estimation.

FIG. 1 depicts one example of a HetNet configuration 100 that includes a Macro base station 102 and two LPNs, LPN1 104a and LPN2 104b. The Macro base station 102 provides wireless service coverage to a region 110 in which the two LPNs 104a and 104b are located. The LPNs 104a and 104b provide service coverage to regions 112 and 108, respectively. In the illustrated example, the coverage areas 108 and 112 are depicted to be non-overlapping only for ease of explanation of certain features. The configuration 100 is shown to serve a UE 106 that is mobile, and is therefore shown to be at three different positions at three different times t1, t2 and t3.

The UE 106 is moving from its initial location close to LPN1 at time t1 to another location close to LPN2, which it reaches at time t3. During that change of location it leaves the LPN1 coverage area 112, is temporarily (e.g. at time t2) served only by the Macro station and then finally is in the coverage area 108 of LPN2 104b.

To operate the network efficiently and to mitigate loss of efficiency due to changes to the wireless communication channel, the UE 106 frequently reports the link quality of all nodes within the cell 110 from which the UE 106 is able to receive signals. As previously discussed, based on the feedback report from the UE 106, the network is able to track the UE location at the time of receiving the reference signal. In some implementations, the position location can be achieved with a reference signal that is transmitted from all nodes that are candidates for PDSCH transmission. In some implementations, the CSI-RS reference sequence is used to achieve UE location estimation.

In LTE, the UE knows which transmission resources will be used for downlink CSI-RS transmissions, based on the expression for allocation of RBs to CSI-RS transmissions. However, the information about which transmission points send a downlink radio frequency (RF) transmission in which RBs allocated to the CSI-RS is not conveyed to the UEs. After receiving CSI-RS, the UE is simply expected to report CQI values based on the CSI-RS measurement. The network can then map the received CQI report to the corresponding node. For example, some CSI-RS transmissions may be performed by LPN1 (114), while some CSI-RS transmissions may be performed by the Macro base station 102 (116) and other transmissions 118 may be performed from the LPN2. In some implementations, reference signal transmissions thus are not only spatially diverse (i.e., sent from geographically separated transmission points) but also temporally diverse (i.e., different transmission points take turn to use RBs allocated for reference signal transmissions according to a sequence). In FIG. 1, the temporal diversity is indicated with the time labels Ta, Tb and Tc for transmissions 114, 116 and 118.

In the example depicted in FIG. 1, at time t1, based on the CQI reports received, the network may decide that LPN1 104a is the most suitable node to transmit data to the UE 106. Therefore, the network may direct LPN1 to transmit downlink data to the UE 106 using PDSCH. To help monitor and maintain link quality, the network therefore also controls LPN1 104a to transmit a reference signal for link adaptation.

When the UE 106 is the moving towards LPN2 104b while possibly also receiving downlink data over PDSCH transmissions from LPN1 104a, at some point in time (e.g. t2) the UE's CQI reports to the network may indicate to the network that the Macro base station 102 is the best suited node for data transmissions to the UE 106 at time t2. The network could then decide to send PDSCH and the reference signal for link adaptation exclusively from the Macro base station 102. However, this decision by the network may remain completely unknown to the UE 106 because the UE 106 still keeps receiving reference signal transmissions according to the a priori schedule, only the identity of the transmission point that sends the transmission changes. When the UE 106 reaches within the coverage area 108 of LPN2 104b, the network may then control the transmission points such that the UE 106 receives the PDSCH and the reference signal from LPN2 104b.

While in general, two different reference signal sequences can be used, one for link adaptation and another for location estimation, it is also possible to use the same type of reference signal (e.g., CSI-RS for LTE) sequence is used for that purpose.

Figure 2:
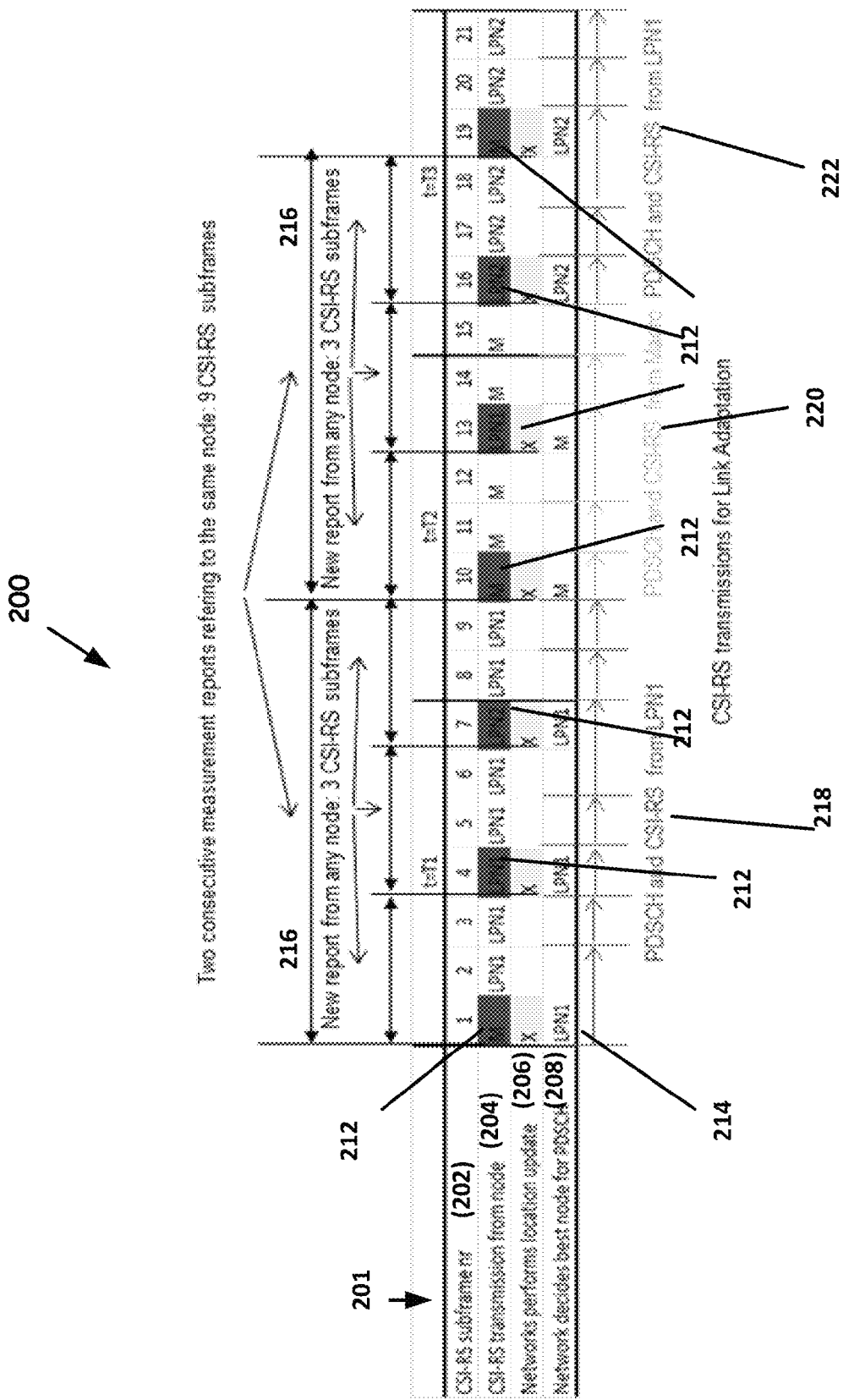
FIG. 2 shows a schedule of reference signal transmissions in a wireless network.

FIG. 2 depicts a scheduling table 200 that highlights a scheduling example for the CSI-RS scheduling that could be applied to the scenario of FIG. 1. Column 210 lists multiple row entries. The row 202 lists CSI-RS subframe numbering from the CSI-RS sequence, starting at 1 and listed up to subframe 21. The row 204 lists the node or transmission point from which the network schedules the CSI-RS transmission for a given CSI-RS transmission instance. The row 206 lists whether or not the network performs a location estimation/update in a given CSI-RS transmission instance. The row 208 lists which node may be allocated for downlink data transmissions by the network.

The boxes 212 in row 204, from left to right, indicate the following sequence of use of nodes: M, LPN1, LPN2, M, LPN1, LPN2, M . . . etc. As indicated by entries in row 206, the above-listed sequence from row 204 indicates that the network uses CSI-RS transmissions at the boxes 212 to estimate the location of the UE 106. The allocation of these "location estimation" CSI-RS transmissions among all nodes is periodic with a low rate (compared to CSI-RS allocations for link adaptation) between all the nodes. In the example depicted in FIG. 2, it takes 9 CSI-RS sub-frames between two "location estimation" CSI-RS transmissions from the same node. In other words, a UE's updated CQI reports related to one node is processed by the network once every 9 CSI-RS sub-frames for estimating the distance between the UE 106 and that node. The network can configure the time interval between two consecutive CSI-RS sub-frames is configurable by the network. According to the 3GPP LTE R10 standard, this time can be set to 5-, 10-, 20-, 40- or 80 ms.

In the example depicted in FIG. 2, during a time interval spanning three CSI-RS subframes (e.g., interval 216), the network receives one CQI feedback report from the UE from each network transmission point. This time interval, called Location Update Interval (LUI), may be the period used by the network to update location estimate for the UE 106, and in turn may be used to decide downlink data transmission points. For example, in some embodiments, new measurement reports are received and evaluated by the network and the PDSCH transmission node selection is updated on a per-LUI basis. Thus, depending on the evaluation of the CQI report, the network could change the transmission point for PDSCH. In the scheduling example 200, this happens in CSI-RS sub-frame 10 where PDSCH is changed from LPN1 to the Macro base station and CSI-RS sub-frame 16, where PDSCH is changed from the Macro base station to LPN2.

In comparison to the location estimation described above, the use of CSI-RS for link adaptation is repeated much faster. The CSI-RS are also transmitted from the node that is selected for PDSCH transmission. For example, in the time interval 218, as indicated in row 208, the network has decided that LPN1 is most suitable for PDSCH transmission. Thus CSI-RS downlink transmissions are also performed from LPN1. However, at sub-frame 1 (212), since the Macro base station 102 is scheduled to transmit a reference signal for the purpose of location estimation, the link adaptation RB allocations thus may be superseded by location estimation allocations (which occur at a lower repetition rate). From sub-frames 2 to 6, CSI-RS is transmitted only from LPN1. Thus, link adaptation can be done as fast as possible. At sub-frame 7, the PDSCH is still being transmitted from LPN1 but for the purpose of location estimation, LPN2 is given opportunity to transmit CSI-RS over LPN1. In other words, the CQI report sent by the UE 106 at CSI-RS sub-frame 7 may not be used for link adaptation but is usable for an update of the location estimation. For link adaptation, the network could rely on the previously sent CQI report. At sub-frame 10, a UE location update is performed and the PDSCH and CSI-RS transmission for link adaptation is transferred from LPN1 to Macro base station.

In schedule 200, it can be seen that almost every CSI-RS sub-frame can be used for link adaptation. Only at the sub-frames 1, 7, 13 and 19 (and so on) does the network use an older CQI report for link adaptation.

While the example illustrated in FIG. 2 is simplified and uses 2 LPNs and one UE in the cell, it demonstrates that the relationship between scheduling reference signal transmissions for location estimation and link adaptation and how the transmission point of the PDSCH can be changed based on CSI measurement reports received from the UE 106.

Figure 3:
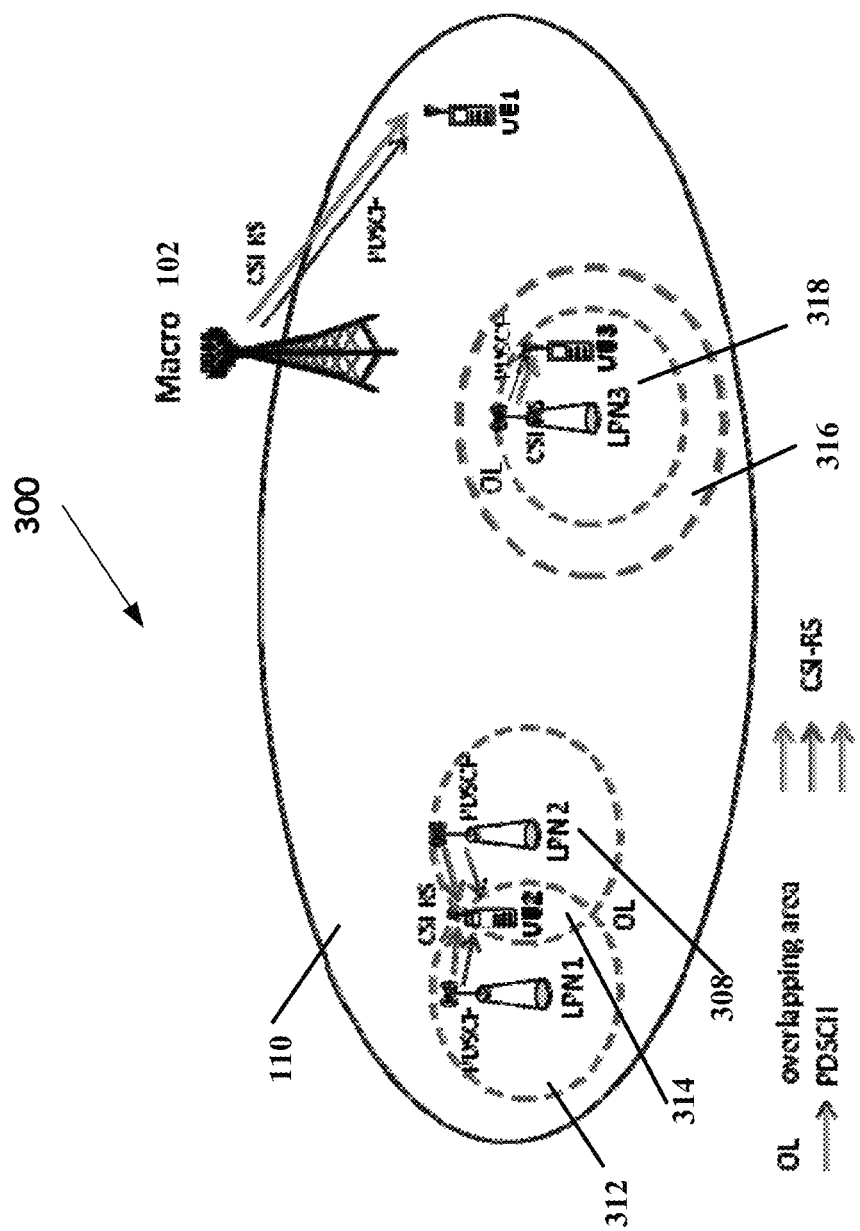
FIG. 3 depicts a wireless network deployment scenario in which at least three low power nodes are present in a macrocell.

FIG. 3 depicts an example HetNet configuration 300 in which 3 UEs are being served by one Macro base station 102 and 3 LPNs 104a, 104b, 104c. The configuration 300 illustrates how to schedule different nodes for CSI-RS transmissions for location estimation, and how to group CSI-RS transmissions from different nodes together to increase the update rate for link adaptation.

Considering the coverage areas of the various nodes in FIG. 3 it can be seen that there is:
One area covered by LPN1 (312)
One area covered by LPN2 (308)

One overlap area (OL) between LPN1 and LPN2 where a joint PDSCH transmission from both nodes is possible (314)

One area covered by LPN3 (318)

One overlap area (OL) between LPN3 and the Macro where a joint PDSCH transmission from both nodes is possible (318)

Everything else covered by the Macro base station 102 (remaining area of 110)

Therefore, in some implementations, the candidates for PDSCH transmission are:

(1) Macro 102
(2) LPN1
(3) LPN2
(4) LPN3
(5) LPN1+LPN2 (Joint Transmission)
(6) Macro+LPN3 (Joint Transmission)

There are several possibilities to schedule CSI-RS transmission for location estimation and to find the PDSCH transmission points:

In some implementations, all candidates are scheduled at different and distinct time instances. In other words, the Joint Transmission candidates (5 and 6) are also scheduled.

In some implementations, only single nodes are scheduled to transmit CSI-RS. In other words the Joint Transmissions (5 and 6 in the enumeration above) are not used.

Using and scheduling the joint transmission candidates has the advantage that the network may be able to get an explicit report regarding the quality of downlink transmission received at the UE, and may therefore be able to decide for PDSCH with joint transmission. However, this increased granularity of feedback has the potential drawback that more candidate transmission points (e.g., six instead of four in the above listing) have to be scheduled for location estimation. This would delay the update time between two successive CQI reports referring to the same node, or less CSI-RS sub-frames would be available for link adaptation (since more nodes for location estimation have to be squeezed into the available CSI-RS sub-frames).

In implementations where the joint transmission candidates are not used, the network may need to estimate from the received CQI reports if Joint Transmission were used for downlink transmissions. For example, in some implementations, the network may average the CQI1 from a given UE 106 for CSI-RS transmitted from LPN1 and CQI2 from the same UE for LPN2. In other implementations, CQI1 and CQI2 may be compared with each other. If they are about the same, Joint Transmission from LPN1 and LPN2 could be performed.

In some implementations, whether or not to use the joint transmission candidates may be an operational decision at run time. This decision may depend on how many nodes there are and how many UEs are being served. For example, if the number of UEs being served is below a threshold, e.g., in a simple case when there is just one UE, it may not be as critical to use more number of CSI-RS transmissions for link adaptation and therefore more transmission resources could be allocated to location estimation.

Figure 4:
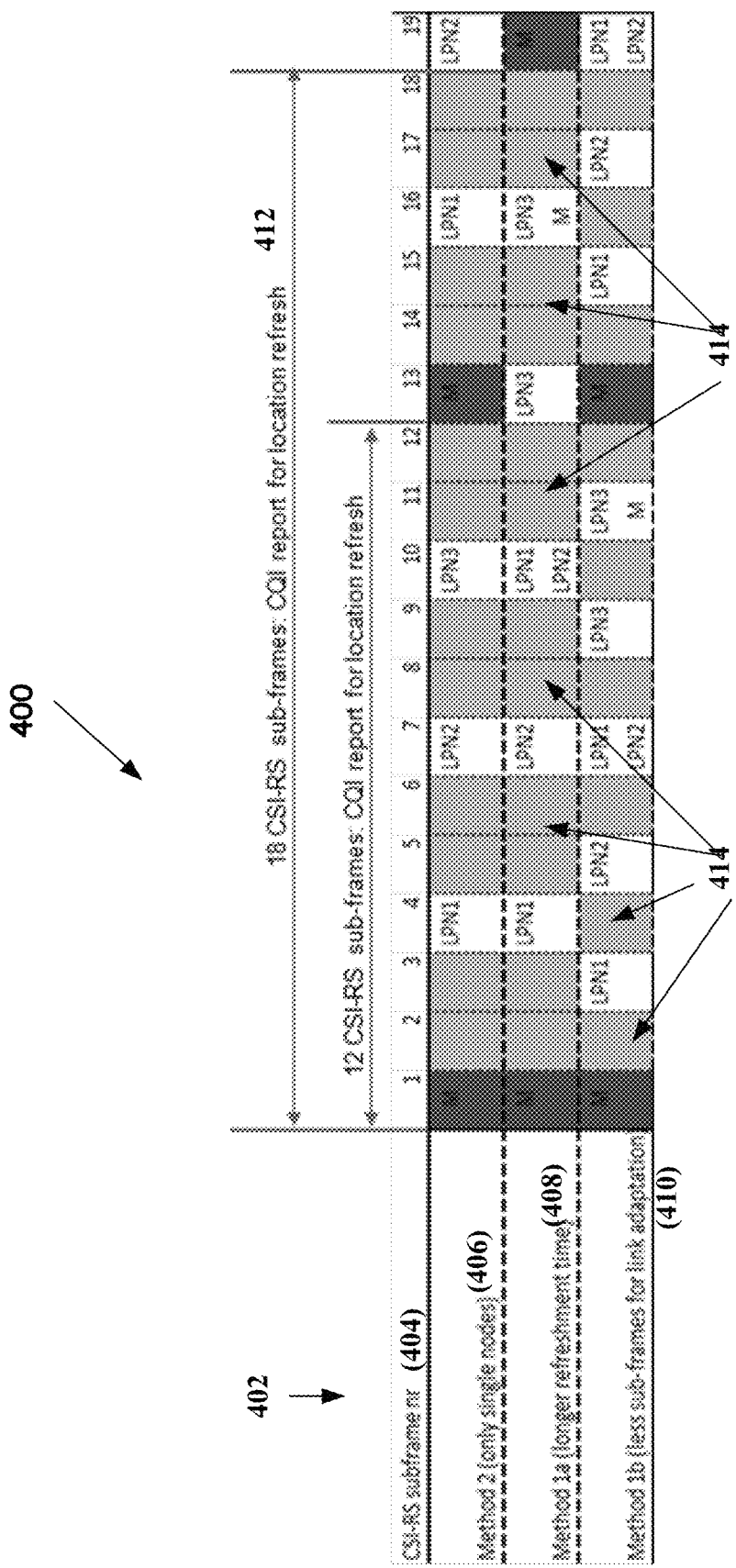
FIG. 4 shows a schedule of reference signal transmissions in a wireless network.

FIG. 4 shows a possible schedule 400 for transmission of CSI-RS by various transmission point configurations. The column 402 lists four rows. The first row 404 lists CSI-RS subframes based on the CSI-RS sequence used in LTE. The row 406 lists the corresponding CSI-RS transmission schedules using "Method 2" that refers to using only individual nodes as the transmission points. The row 408 lists possible CSI-RS transmission opportunity allocations using "Method 1a," further described below. Row 410 lists CSI-RS allocations using "Method 1b" further described below. The possible trade-off between using or not using the joint transmission candidates, i.e., transmission point configurations in which antenna ports that are in geographically different locations, are explained with reference to FIG. 4. The fields with labels (M, LPN1, LPN2 etc.) indicate the CSI-RS sub-frames that are used for location estimation and the shaded fields 414 are the sub-frames that are available to schedule CSI-RS for link adaptation.

In row 406, Method 2 is shown. The subframes 1, 4, 7, 10, 13, 16 and 19 are used for transmitting CSI-RS, the response for which are used for location estimation. It can be seen that this method has a short location refresh time, it takes 12 CSI-RS sub-frames (period 414) until the network receives a new CQI report for any given node.

Method 1 is done in two different ways: In Method 1a, corresponding to row 408, the CSI-RS allocations are done to have the same refresh time as Method 2. Therefore, it takes a longer time period (412) of 19 frames between two consecutive location estimation reports for a given node. However, the number of subframes available for link adaptation is same as in Method 2. In Method 1b, the refresh rate is kept the same, that is, two consecutive location estimation reports are obtained from any given node with the same period (414) as Method 2. However, fewer sub-frames are left to schedule CSI-RS for link adaptation.

In some implementations, the one of the above methods for scheduling the CSI-RS transmission nodes may be realized in a static way. In other words, the above discussed methods offer the feature that the scheduling for link adaption can be adaptive depending on the outcome of the location estimation. This is probably a useful approach in HetNets that include of one Macro and a moderate (e.g., 5 or less) number of LPNs.

But if the number of LPNs increases, even Method 2 which uses less nodes therefore requires fewer CSI-RS sub-frames to be assigned to location estimation task, could reach its limits and leaves too few free sub-frames for link adaptation.

Figure 5:
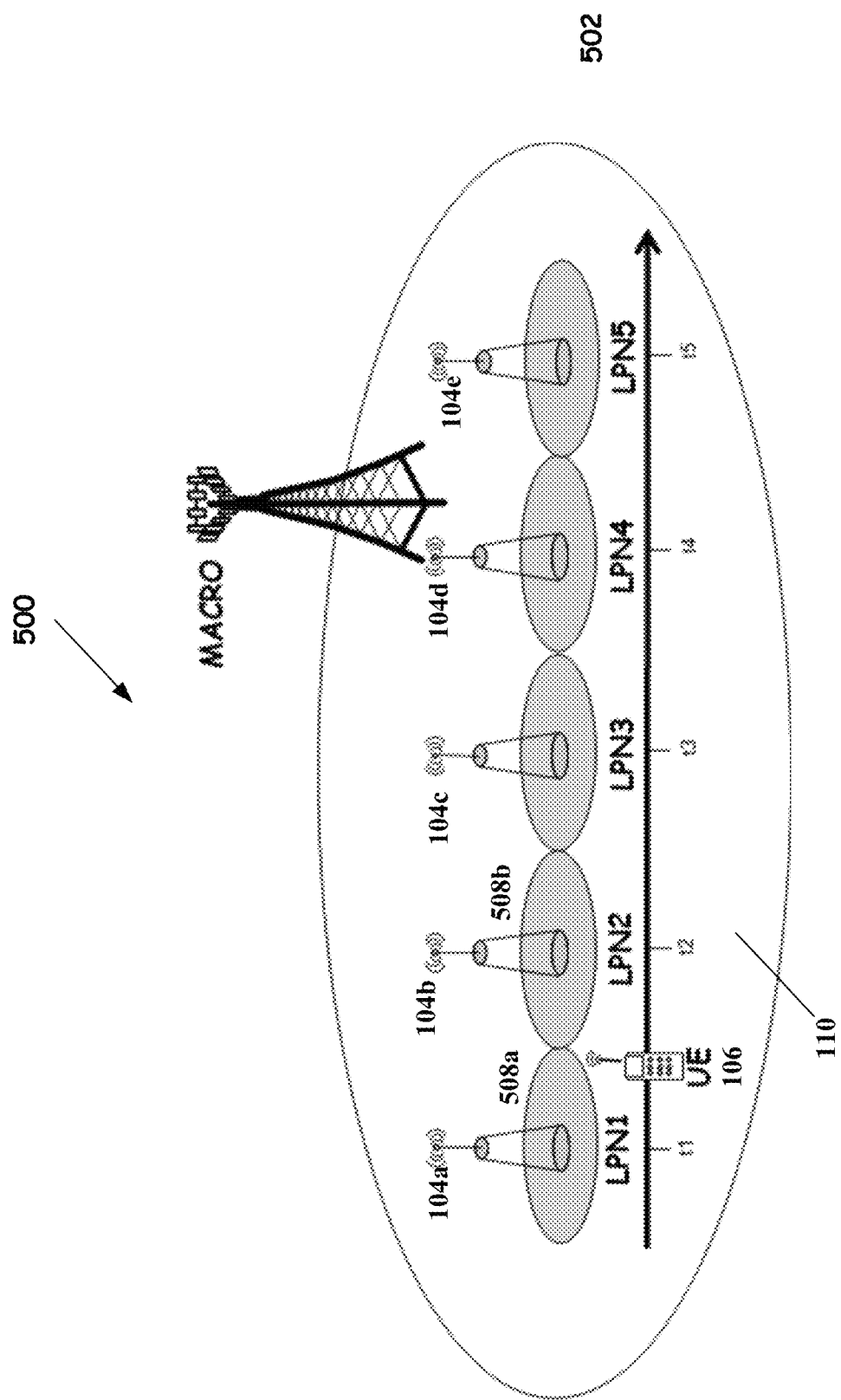
FIG. 5 depicts a wireless network deployment scenario in which multiple (e.g., greater than 3) low power nodes are present in a macrocell.

With reference to FIG. 5, an alternate adaptive CSI-RS allocation method is described. This method uses flexible scheduling also for the CSI-RS transmission nodes for location estimation. The HetNet configuration 500 depicted in FIG. 5 comprises of a single Marco base station 102 and five LPNs, LPN1 104*a*, LPN2 104*b*, LPN3 104*c*, LPN4 104*d* and LPN5 104*e*, in the coverage area 110. In general, the LPNs may have overlapping coverage areas 508*a*, 508*b*, 508*c*, 508*d* and 508*e*, respectively. However, only for ease of explanation, these coverage areas are depicted as being non-overlapping in FIG. 5.

In the scenario depicted in FIG. 5, UE 106 is moving around in the HetNet 500. At t=t1, the UE 106 is close to LPN1 104A and LPN2 104B. In some embodiments, the network may maintain a topological map of coverage areas of the various LPNs (e.g., based on previous location estimation feedbacks from other UEs). Therefore, the network may have the knowledge that UE1 106 is at a position that is unreachable for signals from LPN4 104*d* and LPN5 104*e*. The network may therefore refrain from scheduling reference signal transmissions from LPN4 and LPN5 to UE 106 at time t1 because the transmissions would not be received by the UE anyways. The network may further estimate from a recent history of location estimates for the UE 106 that the UE 106 is moving in the direction of the coverage area of LPN3 104*c*. Thus, at t1 the network may schedule CSI-RS for LPN1, LPN2 and optionally LPN3. At t2, the network may schedule CSI-RS transmissions from LPN1, LPN2 and LPN3. When the UE 106 is moving further, e.g. at t=t3, the network is scheduling LPN2, LPN3 and LPN4, and so on. In some embodiments, a sub-set of all possible transmission point candidates may be scheduled for location estimation.

In some embodiments, when multiple UEs 106 are present in the HetNet, the following technique may be used. Let N bet the set of all available candidate transmission point configurations for PDSCH transmission in the cell (i.e. all nodes and possible combinations of nodes for joint transmission). Then, when there are p UEs in the Herne, based on its current location, each UE may be associated with its own neighbor list, $L_{UEi}$, i=1, . . . p , which is a sub-set of N, i.e. $L_{UEi} \subseteq N$, N being an integer representing the total number of transmission point configurations possible for the HetNet. As long as $$\bigcup_{i=1}^{p} L_{UEi} \subset N,$$

the method of selectively refraining from transmitting reference signals from some transmission points uses less resources than static CSI-RS node scheduling.

FIG. 6 depicts a schedule 600 which shows how the different scheduling schemes described above can be further optimized by grouping different nodes together in order to increase the update rate for link adaptation.

Referring back to the HetNet configuration 300 depicted in FIG. 3, it can be seen that UE1 is in the coverage area 110 and being served by Macro base station 102 only. UE2 is in the coverage area 314, which is served simultaneously by LPN1 and LPN2. UE3 is in the coverage are 318, being served by LPN3 only. Of these coverage areas, the coverage areas 314 and 318 are non-overlapping. Table 1 lists the three CSI-RS transmission point configurations that can be used for link adaptation:

TABLE 1

| CSI-RS transmissions for link adaptation | |
|---|---|
| M | For link adaptation of UE1 |
| LPN1, LPN2 | For link adaptation of UE2 |
| LPN3 | For link adaptation of UE3 |

In the previously described Method 1b, each transmission point configuration was given its own CSI-RS transmission subframe. Instead of dedicating each of the 3 transmission point configurations their own CSI-RS sub-frame, the nodes that do not have common coverage areas can be combined and transmit the same CSI-RS simultaneously for the purpose of link adaptation for different UEs.

Because LPN1 and LPN2 do not overlap with LPN3, the transmission of CSI-RS for link adaptation from the transmission point configuration (LPN1, LPN2) and LPN3 can be combined. The reception of signals at UE2 is not interfered by transmissions from LPN3. Similarly, the reception of signal at UE3 is not interfered by transmissions from LPN1 and LPN2. Therefore, both UE2 and UE3 can report their CQI simultaneously. The concurrent transmission of CSI-RS from non-overlapping transmission configuration points thus makes available CSI-RS sub-frames for link adaptation that would have otherwise been allocated individually to the different transmission point configurations. In one advantageous aspect, the concurrent transmissions allow for increases reporting frequency by the UEs.

Row 602 shows the schedule of transmission in the numbered CSI-RS subframes, and the transmission point configurations from which CSI-RS reference signal is transmitted according to the Method 1b described with reference to FIG. 4 has been chosen. Every second CSI-RS sub-frame is thus available for link adaptation. In total there are two separate transmissions for link adaptation necessary, one combined for LPN1, LPN2 and LP3 (for link adaptation of UE2 and UE3) and one transmission from the Macro (for link adaptation of UE1).

Referring to row 604, at the CSI-RS sub-frames for location estimation, all UEs are ordered by the network to send a CQI report. This is done at CSI-RS sub-frames 1, 3, 5, 7, 9 and 11.

Referring to row 606, UE1 reports can be used for link adaptation whenever M had transmitted CSI-RS, i.e. at sub-frames 1, 4, 8, 11. At sub-frame 11, CSI-RS is transmitted from M and LPN3 together, that transmission is intended for location estimation of all UEs, but since UE1 is not disturbed by LPN3 the network can use its CQI report for link adaptation.

Referring to row 608, UE2 reports CQI for link adaptation whenever LPN1 and LPN2 have been transmitted simultaneously, i.e. at sub-frames 2, 6, 7, 10, 12.

Referring to row 610, UE3 reports CQI for link adaptation whenever LPN3 has transmitted CSI-RS either exclusively or together with LPN1 and LPN2, i.e. at sub-frames 2, 6, 9, 10, 12.

FIG. 7 is a flowchart representation of a process 700 of selecting an antenna configuration for signal transmissions to a wireless device in a heterogeneous wireless network comprising a macrocell base station and a number of LPNs.

At 702, a location of a wireless device is estimated. In some implementations, the location estimation may be performed using information received from the wireless device. The information may include, e.g., a global positioning system (GPS) reading from the wireless device. In some implementations, the location estimation is performed by transmitting a reference signal to the wireless device (e.g., CSI-RS for LTE) and receiving a feedback report from the wireless device. The feedback report is related to the reference signal, e.g., the previously described CQI report for CSI-RS in an LTE network. As previously described, the results obtained from the location estimation are used to decide a schedule of transmission of reference signals. The schedule is then used to perform future transmissions of the reference signal using the determined antenna configuration. As previously described with respect to FIGS. 1 to 6, in some configurations, the reference signal transmitted to the wireless device at two different time periods (e.g., LTE subframes) may be from two different nodes selected from the macrocell base station and the LPNs. Furthermore, the antenna configuration used for downlink signal transmissions may use transmission antenna from one of the LPNs and also include antenna from the macrocell base station.

At 704, based on the estimated location of the wireless device, the antenna configuration for downlink signal transmissions to the wireless device is determined. The antenna configuration specifies one or more transmission points from the macrocell base station and the plurality of LPNs. As previously described, the antenna configuration may specify a single node or may specify a combination of nodes to transmit the downlink signals.

The method 700 further may include generating a transmission schedule for the downlink signal transmissions to the wireless device. The transmission schedule may be generated by grouping reference signal transmissions in a first group for performing location estimation and a second group for performing link adaptation. In some implementations, the repetition rate allocated to the location estimation reference signal transmissions is less than the repetition rate of reference signal transmissions for the link adaptation, e.g., as previously discussed with respect to FIGS. 4 and 6.

FIG. 8 is a block diagram representation of a wireless communication apparatus 800. The module 802 is for estimating a location of the wireless device. The module 804 is for determining, based on the estimated location of the wireless device, the antenna configuration for downlink signal transmissions to the wireless device, wherein the antenna configuration specifies one or more transmission points from the macrocell base station and the plurality of LPNs. In various implementations, the apparatus 800 and modules 802 and 804 are further configured to implement one or more of the techniques disclosed in this document.

FIG. 10 is a flow chart representation of a process 1000 for scheduling downlink reference signal transmissions in a heterogeneous wireless network. In some implementations, the reference signal comprises the CSI-RS signal that is discussed previously.

At 1002, a first schedule of downlink reference signal transmissions is generated such that each entry in the first schedule identifies a first transmission time slot, a first transmission point group that transmits the downlink reference signal and a first UE that produces a first measurement report. For example, the first measurement report may be related to location information for the first UE (e.g., may include received signal strength information). The schedule may be generated and used at the network-side, e.g., by the macro base station. The schedule need not externally be advertised by the macro base station because in HetNet configurations, the LPNs are completely controlled by the macro base station. In some implementations, the macro base station may explicitly transmit the schedule to the various LPNs in the macro cell. In some implementations, the macro base station may simply identify transmission times to the LPNs, without providing additional detail about which other transmission points are also being controlled to simultaneously transmit the reference signal.

At 1004, a second schedule of downlink reference signal transmissions is generated such that each entry in the second schedule identifies a second transmission time slot, a second transmission point group that transmits the downlink reference signal and a second UE that produces a second measurement report. In some implementations, the second measurement report comprises a channel quality indicator (CQI) report, as previously discussed. The use of schedule entries is previously discussed with respect to 1002.

The first and the second schedules define transmission time slots such that a given time slot included in the second schedule is excluded from the first schedule. The first schedule is designed to receive the first measurement report from a given UE at a first repetition frequency that is smaller than a second repetition frequency with which the second measurement report is received from the given UE. Entries in the second schedule identify reference signal transmission from the second transmission point group to the second UE only when the second transmission point group is also being used to transmit user data to the second UE.

In some implementations, the above-discussed transmission point groups are formed based on UE location information. For example, as discussed previously with respect to FIGS. 1, 3 and 5, a transmission point group may include only the transmission points whose coverage area the UE is in. However, as previously discussed with respect to FIG. 5, in some implementations, based on a determined direction of movement of the UE, an additional transmission point may be used for reference signal transmissions, even when the UE is currently not in the coverage area of that transmission point, however the UE appears to be approaching coverage area of that transmission point. Therefore, in some implementations, one of the transmission point group includes a first transmission point and a second transmission point that has a coverage area that is non-overlapping with that of the first transmission point.

One of skill in the art will appreciate that techniques have been disclosed that find UE locations and determine a best suited node for downlink data transmission. Furthermore, depending on the UE locations, reference signal transmission resources are dynamically assigned to the different nodes for the purpose of link adaptation. In some implementation, the node selection is done with help of downlink reference signals that the UE measures and gives feedback on.

One of skill in the art will further appreciate that the disclosed techniques are beneficial in optimizing the operation of HetNets by using a same reference signal for multiple uses (e.g., location estimation and link adaptation), where the network can manage scheduling of the reference signal transmissions in a manner that is completely transparent to the UEs and be able to use location information of the UEs to improve bandwidth availability of the wireless network.

The disclosed and other embodiments, modules and the functional operations described in this document (e.g., a location estimator, an antenna configurator, a first scheduler, a second scheduler, a reference signal transmitter, a feedback report receiver, a scheduler, a transmission point group creator, a data transmission time assigner, a reference signal transmission time assigner, a user data transmitter, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for scheduling downlink reference signal transmissions in a heterogeneous wireless network comprising a plurality of transmission point groups made up from a macrocell base station and at least one low power node (LPN), serving a plurality user equipment (UEs), the method comprising:

generating a first schedule of downlink reference signal transmissions such that each entry in the first schedule identifies a first transmission time slot, a first transmission point group that transmits the downlink reference signal and a first UE that produces a first measurement report;

generating a second schedule of downlink reference signal transmissions such that each entry in the second schedule identifies a second transmission time slot, a second transmission point group that transmits the downlink reference signal and a second UE that produces a second measurement report;

wherein the first and the second schedules define transmission time slots such that a given time slot included in the second schedule is excluded from the first schedule;

wherein the first schedule is designed to receive the first measurement report from a given UE at a first repetition frequency that is smaller than a second repetition frequency with which the second measurement report is received from the given UE; and wherein entries in the second schedule identify reference signal transmission from the second transmission point group to the second UE only when the second transmission point group is also being used to transmit user data to the second UE.

2. The method of claim 1, wherein the first measurement report relates to a location information for the first UE.

3. The method of claim 1, wherein the second measurement report includes a channel quality indicator (CQI) report.

4. The method of claim 1, wherein the transmission point groups are formed based on UE location information.

5. The method of claim 1, wherein one of the transmission point group includes a first transmission point and a second transmission point that has a coverage area that is non-overlapping with that of the first transmission point.

6. An apparatus for scheduling downlink reference signal transmissions in a heterogeneous wireless network comprising a plurality of transmission point groups made up from a macrocell base station and at least one low power node (LPN), serving a plurality user equipment (UEs), the apparatus comprising:

a first scheduler that generates a first schedule of downlink reference signal transmissions such that each entry in the first schedule identifies a first transmission time slot, a first transmission point group that transmits the downlink reference signal and a first UE that produces a first measurement report;

a second scheduler that generates a second schedule of downlink reference signal transmissions such that each entry in the second schedule identifies a second transmission time slot, a second transmission point group that transmits the downlink reference signal and a second UE that produces a second measurement report;

wherein the first and the second schedules define transmission time slots such that a given time slot included in the second schedule is excluded from the first schedule;

wherein the first schedule is designed to receive the first measurement report from a given UE at a first repetition frequency that is smaller than a second repetition frequency with which the second measurement report is received from the given UE; and wherein entries in the second schedule identify reference signal transmission from the second transmission point group to the second UE only when the second transmission point group is also being used to transmit user data to the second UE.

7. The apparatus of claim 6, wherein the first measurement report relates to a location information for the first UE.

8. The apparatus of claim 6, wherein the second measurement report includes a channel quality indicator (CQI) report.

9. The apparatus of claim 6, wherein the transmission point groups are formed based on UE location information.

10. The apparatus of claim 6, wherein one of the transmission point group includes a first transmission point and a second transmission point that has a coverage area that is non-overlapping with that of the first transmission point.

11. A non-transitory computer readable storage medium having code stored thereupon, the code, when executed, causing a processor to implement a method for scheduling downlink reference signal transmissions in a heterogeneous wireless network comprising a plurality of transmission point groups made up from a macrocell base station and at least one low power node (LPN), serving a plurality user equipment (UEs), the method comprising:
  generating a first schedule of downlink reference signal transmissions such that each entry in the first schedule identifies a first transmission time slot, a first transmission point group that transmits the downlink reference signal and a first UE that produces a first measurement report;
  generating a second schedule of downlink reference signal transmissions such that each entry in the second schedule identifies a second transmission time slot, a second transmission point group that transmits the downlink reference signal and a second UE that produces a second measurement report;
  wherein the first and the second schedules define transmission time slots such that a given time slot included in the second schedule is excluded from the first schedule;
  wherein the first schedule is designed to receive the first measurement report from a given UE at a first repetition frequency that is smaller than a second repetition frequency with which the second measurement report is received from the given UE; and
  wherein entries in the second schedule identify reference signal transmission from the second transmission point group to the second UE only when the second transmission point group is also being used to transmit user data to the second UE.

12. The computer readable storage medium of claim 11, wherein the first measurement report relates to a location information for the first UE.

13. The computer readable storage medium of claim 11, wherein the second measurement report includes a channel quality indicator (CQI) report.

14. The computer readable storage medium of claim 11, wherein the transmission point groups are formed based on UE location information.

15. The computer readable storage medium of claim 11, wherein one of the transmission point group includes a first transmission point and a second transmission point that has a coverage area that is non-overlapping with that of the first transmission point.

* * * * *